United States Patent [19]

Robbins

[11] Patent Number: 5,108,604
[45] Date of Patent: Apr. 28, 1992

[54] SEMIPERMEABLE MEMBRANE CARTRIDGE AND METHOD OF MAKING

[75] Inventor: Adam Robbins, San Marcos, Calif.

[73] Assignee: Desalination Systems, Inc., Escondido, Calif.

[21] Appl. No.: 749,151

[22] Filed: Aug. 23, 1991

[51] Int. Cl.⁵ .............................................. B01D 63/10
[52] U.S. Cl. ........................ 210/321.74; 210/321.83; 210/497.1
[58] Field of Search ........... 210/321.6, 321.72, 321.74, 210/321.78, 321.83, 321.87, 493.4, 494.1, 494.3, 497.1

[56] References Cited

U.S. PATENT DOCUMENTS

| | | | |
|---|---|---|---|
| 3,417,870 | 12/1968 | Bray | 210/321 |
| 3,966,616 | 6/1976 | Bray | 210/433 |
| 4,517,085 | 5/1985 | Driscoll et al. | 210/232 |
| 4,548,714 | 10/1985 | Kirwan, Jr. et al. | 210/232 |
| 4,600,512 | 7/1986 | Aid | 210/433 |

Primary Examiner—Frank Sever
Attorney, Agent, or Firm—Fitch, Even, Tabin & Flannery

[57] ABSTRACT

Cartridges for use in ultrafiltration or reverse osmosis separation devices are formed by injection molding a generally tubular, smooth, seamless shell about a spirally-wrapped semipermeable membrane assembly. These cartridges can be used within traditional separation devices having pressure vessels of precise interior diameter, for which the cartridges are uniquely suited because they have cylindrical surfaces of true circular cross-section and close tolerances. The cartridges can also be created so as to incorporate integral pressure vessels and thus permit their use in separation processes without the need for surrounding supporting pressure vessels. A reaction injection molding process is shown which provides for substantial efficiencies in the overall manufacturing of semipermeable membrane separation cartridges of the spirally-wound variety.

21 Claims, 3 Drawing Sheets

SEMIPERMEABLE MEMBRANE CARTRIDGE AND METHOD OF MAKING

FIELD OF THE INVENTION

This invention relates to semipermeable membrane cartridges for use in reverse osmosis and ultrafiltration systems and to methods of making such cartridges of particularly uniform character.

BACKGROUND OF THE INVENTION

The art of membrane separation devices, particularly those using cartridges having membranes which are spirally wound about central porous tubes, is well-developed today. Such cartridges are used in many and varied separation devices and processes. U.S. Pat. Nos. 3,417,870 and 3,966,616 are examples of patents which show such semipermeable membrane spirally wound cartridges. Such spirally wound membrane cartridges generally employ a central porous collection tube, having a series of holes which provide for fluid flow between the interior and exterior surfaces of the tube. Spirally wound about the exterior surface of this central tube is at least one generally flat tubular envelope usually made of two sheets of adhesively joined semipermeable membrane, the interior of which envelope contains spacer or permeate passageway material. A sheet of spacer or inlet flow-passageway-providing material also lies adjacent an outer surface of the envelope and is spirally wound with it about the central tube so as to provide a passageway in the annular region surrounding the tube which extends axially from end to end throughout the spirally wound assembly.

Generally, more than one set of such combinations of tubular envelopes and spacer sheets make up the spiral winding, and the exterior of the wound assembly is usually wrapped in some manner. For example, U.S. Pat. No. 4,600,512 shows a spirally wound assembly in which the wrapped membrane assembly is held together by helical taping about the complete outer cylindrical surface thereof, and such taping can extend to locations along the outer circumferences of molded plastic circular retainers which are located at each end. The particular cartridge shown in this patent is designed to be positioned in a surrounding pressure vessel and aligned therein so as to leave an annular gap between the interior pressure vessel wall and the exterior of the cartridge which serves as a flow passageway for the inlet fluid stream being treated. Other membrane cartridges are designed to fit snugly against the interior surface of a pressure vessel, such as that shown in U.S. Pat. No. 4,548,714, or to fit fairly closely thereto and have an O-ring or chevron-type seal or the like at the inlet end, such as that which is somewhat schematically shown in U.S. Pat. No. 4,517,085.

These spirally wound cartridges are generally manually or semi-automatically wrapped about the central tube, and their exterior surfaces inherently have some undulations, the number of which increases with the number of separate leaves employed in the spiral winding. Moreover, the wrapping procedure is frequently relatively labor-intensive and often requires careful quality control procedures. Thus, improvements in the construction of spirally wound semipermeable membrane cartridges continue to be sought, along with improved methods for making such cartridges.

SUMMARY OF THE INVENTION

The invention generally provides improved spirally wound semipermeable membrane cartridges having an integral outer structural casing or shell in the form of a seamless, rigid or semi-rigid containment structure encapsulating therewithin the spirally wound components, and it also provides methods for making such improved cartridges. Moreover, the invention is capable of providing cartridges having an outer shell which is itself capable of containing the internal fluid pressure within the passageways of the spiral cartridge in a manner to minimize physical distortion in the diametrical dimensions of the cartridge without the necessity for ancillary external support. In addition, the invention provides for production of such cartridges with a far greater degree of physical uniformity than is presently attainable using current state-of-the-art industry practices; more specifically, the method is also capable of consistently attaining a high degree of outer surface smoothness and uniformity and a notable lack of surface irregularities and imperfections that have been generally inherent in current state-of-the-art industry practices.

Somewhat more specifically, the invention provides methods for making spirally wound semipermeable membrane cartridges including a central permeate tube, about which a membrane assembly is spirally wound, and which carries a pair of circular retainers, one at each end thereof, with the circumferences of the circular retainers being interconnected by a formed-in-place shell of polymeric material. This shell provides the cartridge with an outer, right circular cylindrical, smooth, seamless surface of uniform dimension along its entire length. In this method for making such improved cartridges, a flowable material is injected into an appropriate cylindrical mold cavity wherein a spirally wound and appropriately restrained subassembly is aligned, thereby forming such shell in place about the exterior of the subassembly to create an integral cartridge.

DETAILED DESCRIPTION OF THE PREFERRED EMBODIMENTS

Very generally, the invention provides an integrally sealed, spirally wound, reverse osmosis or ultra-filtration cartridge 11 having a pair of circular retainers 13, one at each axial end. The spiral winding formed of the semipermeable sheet material and its associated groups of spacer sheets and passageway-providing material is of generally standard construction; although any suitable construction can be used for the spirally wound subassembly, a preferred type of construction is shown in FIG. 1.

Figure 1:
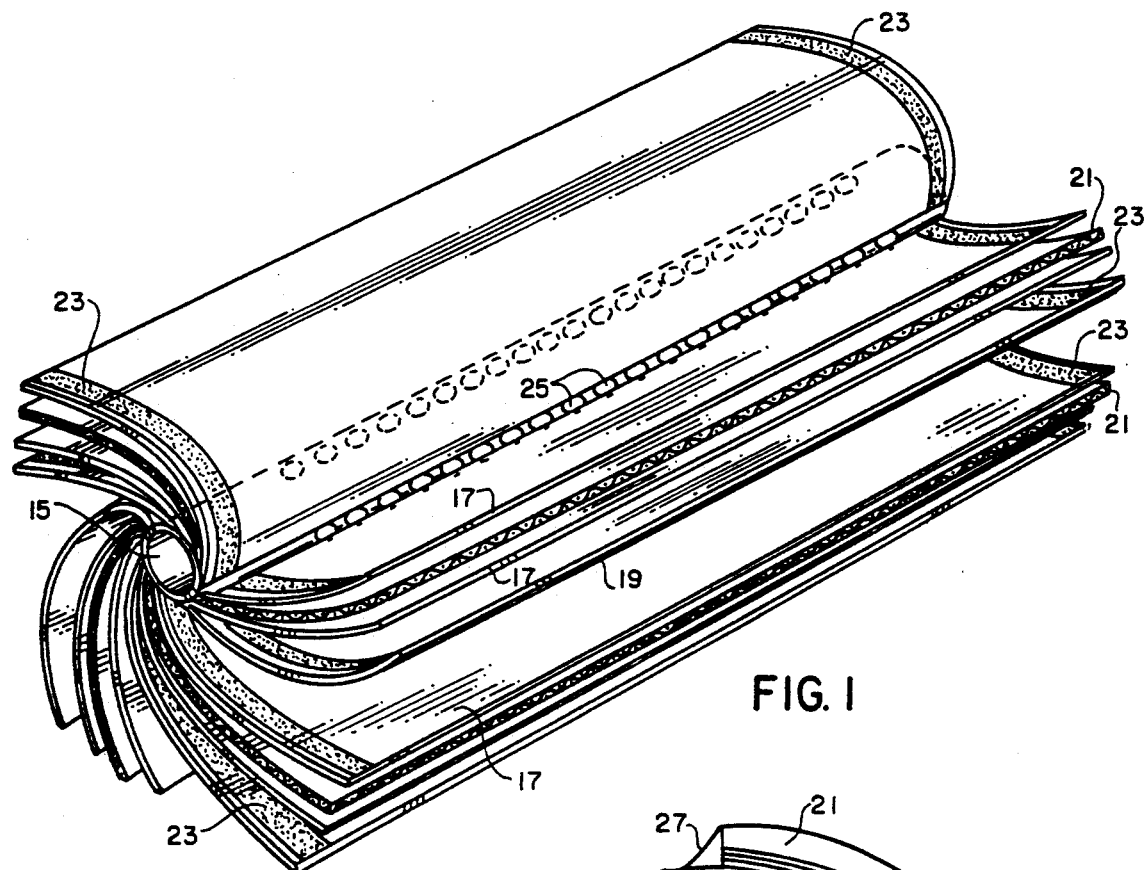
FIG. 1 is a perspective view showing how a plurality of sheets or leaves of semipermeable membrane material and passageway-providing material are spirally wrapped around a central porous tube.

The assembly illustrated in FIG. 1 utilizes a central porous permeate or collection tube 15 made of a suitable material, such as metal or preferably plastic, the character of which material is chosen so as to be chemically compatible with the fluid streams to which it will be exposed. A plurality of rectangular sheets or leaves of discrete materials are independently attached, along inner edges thereof, to the exterior surface of the collection tube 15. More specifically, groups of two facing rectangular sheets 17 of semipermeable membrane material are arranged so as to sandwich a sheet 19 of permeate passageway material therebetween, and a sheet of spacer material 21 is located between each adjacent three-sheet group. Although asymmetric semipermeable membranes can be employed for the sheet-like membranes, the more recently developed composite or thin film membranes are becoming more widely used. In this type of membrane, a dense active layer is formed of a chemically different material than a nonactive supporting layer. Such composite membranes are made by various suitable methods; however, an interfacial condensation reaction is generally carried out wherein a thin film is formed by two reactants, creating a thin, dense polymeric surface, often a polyamide, having the desired semipermeable characteristics. The dense active layers are located on the outer surfaces of the envelope, with the nonactive layers lying against the permeate passageway sheets 19.

The porous, less dense supporting layer, upon which the interfacial condensation reaction takes place, can be of any suitable polymeric material, preferably a polysulfone, having the desired pore size to adequately support the ultrathin interfacial layer without creating undesirably high pressure drops across it. This type of a membrane-supporting polysulfone layer is cast upon a very thin layer of polyester nonwoven felt backing material which essentially integrally supports the membrane material against puncture and excessive deformation even at high feed pressures. Such a polyester felt backing layer is normally considered to be a part of the composite membrane sheet itself, lying adjacent to the membrane nonactive surface and being sealed along its lateral and distal edge surfaces by a flexible adhesive directly to the permeate passageway material and indirectly (or directly along these edges) to the opposite facing sheet of membrane to create the flat envelope.

Generally, materials that will be used for the construction of these cartridges will be selected by those having the ordinary skill in the art for the particular application in question. The central tubes 15 are chosen from suitable materials compatible with the intended commercial use; for example, high strength plastic materials, such as polyvinylchloride, can be employed. The permeate-passageway or transfer leaves 19 may be of porous felt or fabric material, as well known in the art, and felts sold under the brand name "Tricot", made of polyester material are frequently used. The permeate-passageway layer can also be a coated knitted or woven material, such as a Tricot polyester knit, or an epoxy or melamine-coated polyester material. Extruded, cross-filament-like materials, as are known in this art, can also be used. The spacer sheets 21 may be extruded polyethylene or polypropylene material, such as that sold under the trademark Vexar, or similar woven materials.

In order to seal the lateral edges of such groups and to create flat envelopes of semipermeable membrane material with a permeate passageway 19 sheet located within such a flat envelope, strips of adhesive material 23 are applied along the lateral edges of the facing surfaces of each pair of semipermeable membrane sheets 17, and adhesive is also applied along the lateral edges of the permeate passageway sheets 19 so as to saturate through each edge and create a total edge seal along each of the envelopes. The adhesives used to bond the sheet material can be of the polyurethane type, as well known in this art; epoxy resin formulations having suitable setting times can alternatively be employed, as well as other polymeric adhesives, such as those which are polymers or copolymers of vinyl resins. If desired, the permeate passageway sheets 19 can be slightly narrower than the semipermeable membrane sheets 17 so that there is an actual membrane to membrane seal along the ultimate edges. Similar strips of adhesive are also applied along the outermost or distal edges of the semipermeable membrane sheets 17 and the permeate sheets 19 (not shown in FIG. 1, which is a shortened version of the actual leaves that are much longer); this line of adhesive completes the flat envelope construction. The opposite inner end of the permeate-passageway material 19 leads to one of the rows of holes 25 which extend longitudinally along the porous central tube 15 and thus convey the permeate into the interior of the tube. The flanking pair of semipermeable membrane sheets 17 which sandwich the permeate passageway sheet 19 therebetween to create the envelope have their edges adhesively bonded to the imperforate outer surface portion of the porous tube 15 so as to create a flanking seal about this row of holes which thus have communication only to the interior of the flat envelope.

Figure 2:
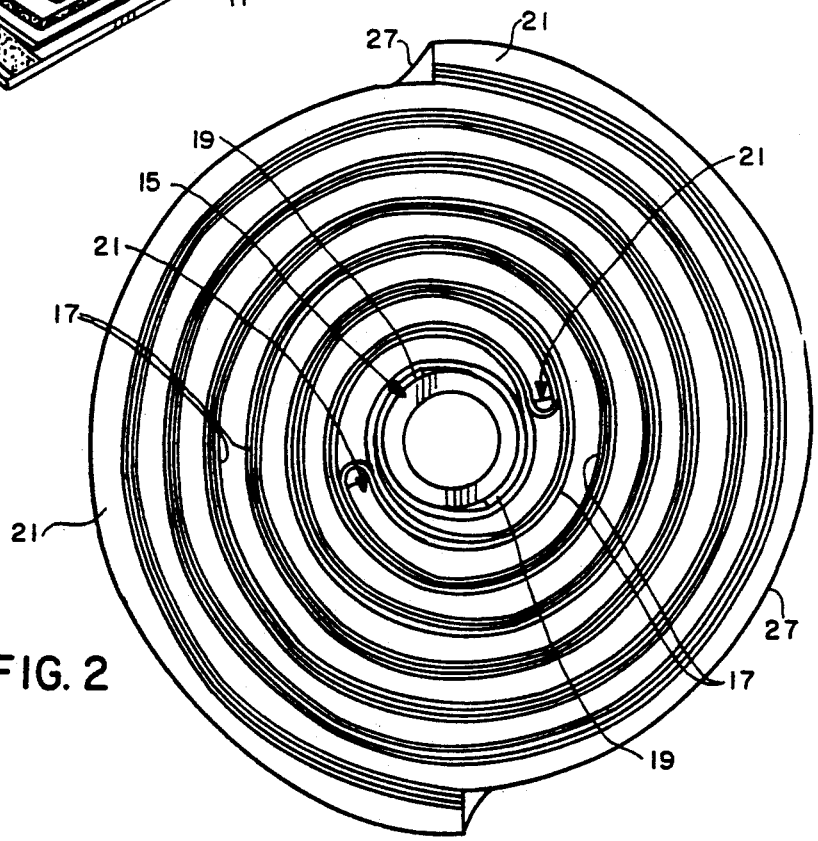
FIG. 2 is an end view of the membrane assembly shown in FIG. 1 after it has been spirally wound, with the tube shown in cross-section.
Figure 3:
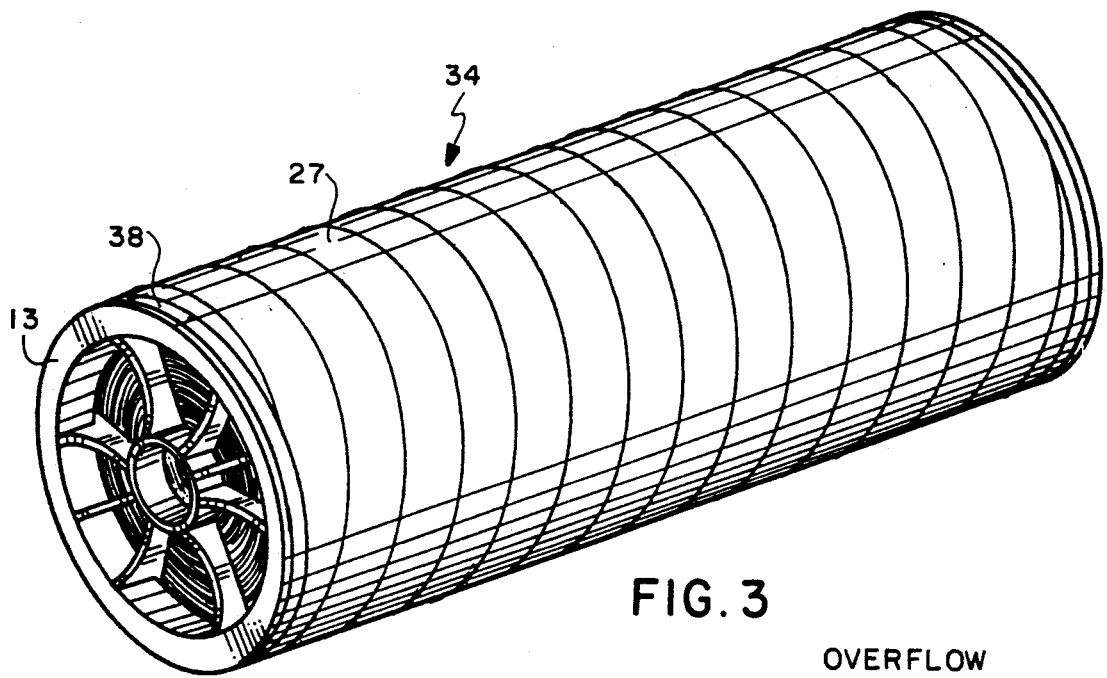
FIG. 3 is a perspective view of the completed and restrained spirally wound assembly of FIG. 2, with the open circular retainers installed at both axial ends thereof.

As shown in FIG. 1, these discrete rectangular sheets are rolled up spirally on the central tube 15 to form a spiral wound cylinder, much in the manner of a rolled window shade. Although reference may sometimes be made to a plastic central tube and to molded plastic end pieces, such as the circular retainers 13 that are attached to the central tube, it should be understood that other materials, such as metallic or mineral compositions may alternatively be used for their construction. Usually at least about 2 leaves are used; however, 4 or 5 leaves are commonly used, with as many as about 24 leaves possibly being used, depending upon the outer diameter of the cartridge. Following rolling of the plurality of leaves about the tube, a configuration somewhat like that depicted in FIG. 2 is obtained wherein the outermost surface, although slightly irregular, will be generally that of a right circular cylinder. Some trimming of the ends of the leaves can be carried out if the circumference is over its specified dimension. A final trimming at each end is carried out so that the lateral edges of the rolled leaves are flush with the ends of the tube 15, and the tube ends are then counterbored if this operation was not earlier performed. In order to maintain this spirally wound condition, the outer surface is preferably completely wrapped with a length of tape 27 in helically encircling fashion as shown in FIG. 3 to provide an impermeable barrier surrounding the spirally wound leaves. The two circular retainers 13 are preferably associated with the rolled subassembly with the tape preferably extends onto the inner edge portion of each circular retainer rim.

Figure 4:
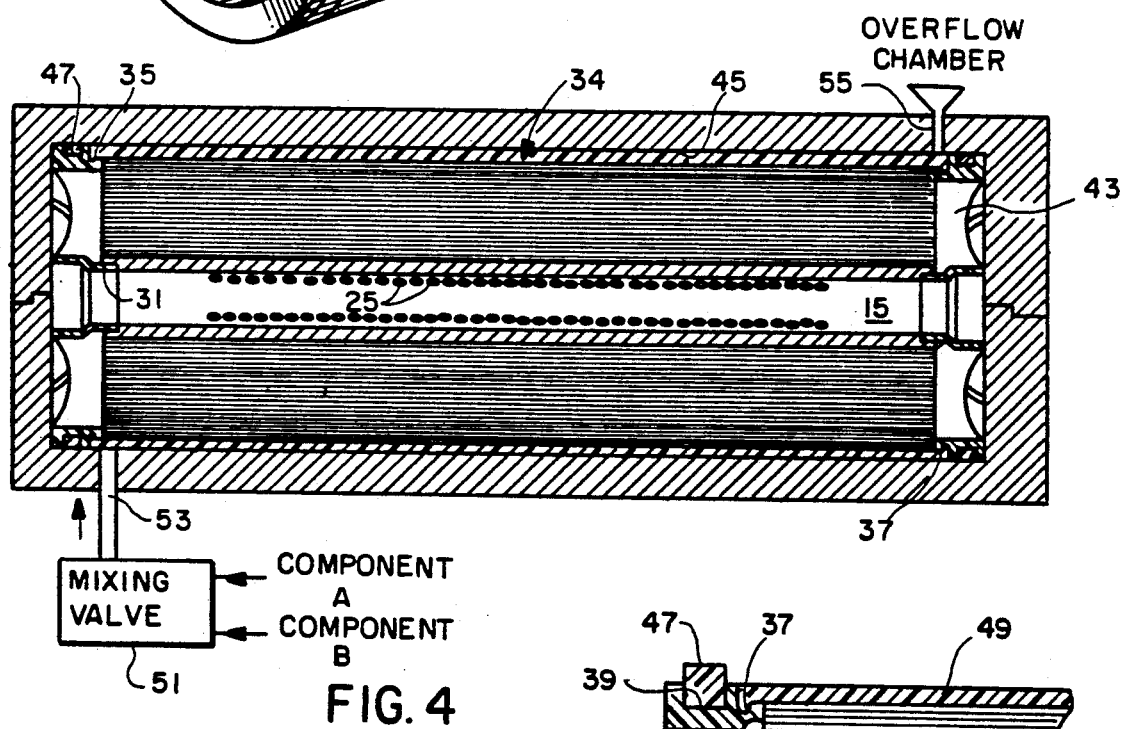
FIG. 4 is a cross-sectional schematic view taken longitudinally through the assembly illustrated in FIG. 3, installed in an appropriate mold cavity.
Figure 5:
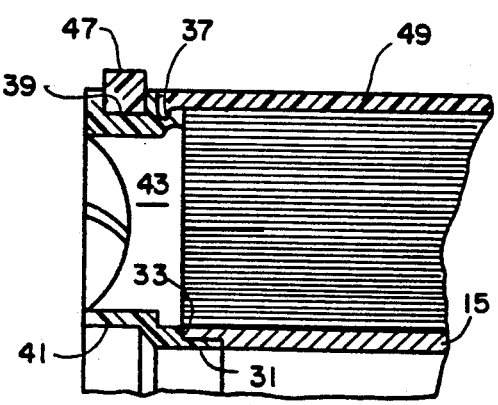
FIG. 5 is a fragmentary cross-sectional view, enlarged in size, similar to FIG. 4, which shows certain details of the completed cartridge after its withdrawal from the mold cavity.

A male boss 31 extends inward from the inner face of each circular retainer 13 or anti-telescoping device (ATD) and is utilized in installing the retainer on each axial end of the tube 15 and aligning them coaxially. Each end o the central tube is preferably counterbored to a prescribed depth to accommodate the boss, and the male boss 31 is preferably sized so that its interior diameter is equal to or greater than the interior diameter of the permeate tube, as illustrated in FIGS. 4 and 5. The circular retainers 13 are then inserted so that the boss 31 extends into the counterbore of the permeate tube up to a shoulder 33 which abuts the outer axial end surface of the tube. The mechanical connection therebetween is preferably secured either by a suitable adhesive or cement or by spin-welding, although other appropriate ways of attachment, so that the circular retainers resist any axial displacement, can be used.

At this stage in the fabrication, a spirally wound element subassembly 34 has the two circular retainers 13 mechanically fastened to the opposite axial ends of the central tube 15. The plastic tape 27 or other suitable restraining means, which is helically wrapped about the entire circumference and the edges of the rims of the circular retainers, prevents unwinding, particularly along the lateral edges of the spirally wound and taped subassembly where they lie adjacent the interior surfaces of the circular retainers 13.

The outer diameters of the circular retainers 13 are formed to be equal to the desired diameter of the final finished cartridge, and in the version seen in FIGS. 4 and 5, the interior surface of each circular retainer radially outward of the boss 31 is flush against the end surface of the spirally rolled membrane subassembly, as best seen in FIGS. 4 and 5. A recess 35 at the interior edge of the rim provides a surface of a diameter about equal to the nominal diameter of the spiral winding, onto which surface the taping extends, and a shallow locking groove 37 is provided at the proximal end of this circular surface for a purpose described hereinafter, the depth of which groove is preferably at least 0.03 inch, e.g. 0.06–0.08 inch. The rim 38 of each circular retainer contains a deep groove 39 of preferably rectangular cross-section for accommodating a gasket during the molding process and an annular seal at the feed end in the final installation assembly of the cartridge in a pressure vessel, as explained hereinafter. In addition, the circular retainer 13 includes a central tubular hub 41 from which a plurality of radial arms 43 extend outward to the interior surface of the rim 38. The circular retainers or ATDs 13 are standard components of cartridges of this type and are conveniently molded of polymeric material, e.g. by injection molding polysulfone or PVC or ABS.

With the two circular retainers 13 installed, the helically wrapped assembly is ready for placement into a cylindrical cavity 45 of an injection mold, such as that depicted schematically in FIG. 4. The inner surface of the injection mold cavity 45 is dimensioned and finished to the desired exterior measurements of the ultimate separation cartridge 11. The mold is preferably formed having a generally horizontal parting line, and preferably the upper one-half of the mold cavity is moved out of the way to permit the insertion of the spirally wound subassembly 34. A pair of annular elastomeric gaskets 47 of square cross section are provided, one in each deep groove 39 of the circular retainers 13, which seal against the mold cavity surface and thus confine the molding resin to the annular region between the outer surface of the helical taping and circular retainers 13, as illustrated in FIG. 4. The interior wall of the mold cavity 45 is smooth and dimensioned to have a diameter just slightly greater than the diameters of the two circular retainers without the gaskets installed.

If the interior cavity sidewall is smooth, then the exterior surface of the resulting cartridge will similarly be smooth. However, should it be desired that the exterior surface be textured, e.g. dimpled, the interior wall cavity would be constructed accordingly. Likewise, should it be desired to provide a cartridge having a controlled by-pass flow, shallow, helically extending or transverse interrupted grooves could be created in its exterior surface by the provision of mirror-image surfaces in the cavity wall; such could be used to provide controlled leakage from end to end along the exterior sidewall of such a cartridge. By providing lead-in passages in the rims of the ATDs and omitting any peripheral seal, a controlled by-pass flow, generally equivalent to that provided by the cartridge depicted in U.S. Pat. No. 4,548,714, the disclosure of which is incorporated herein by reference, can be established if desired.

In any event, when the halves of the injection mold are closed, the spirally wound subassembly is held in place because the interior wall of the mold cavity tightly grips and compresses the gaskets 47 which protrude just beyond the circumferences of the two circular retainers. The void volume within the mold cavity in the region between the two flanking circular retainers 13 becomes the volume of the outer casing or shell 49 of the ultimate cartridge. It should be understood that the injection mold is provided with the usual sprue and vent openings and channels, as are commonly used in injection mold applications, and which are more particularly appropriate for use with the injection of a thermosetting polymeric resin which is being formed from two chemical components that are mixed in a valve adjacent the entrance as they are being injected under pressure into the mold cavity using a process that is commonly referred to as Reaction Injection Molding (RIM). Typically, a relatively low pressure operation is preferred wherein the two components for forming a polyurethane are employed under an injection pressure of about 50 psi or less, which components upon mixing react within the mold cavity and produce a microcellular or substantially solid, tough outer casing. Such RIM molding components are readily available from Ciba-Geigy and from American Cyanamid, and there are a number of formulators throughout the U.S. who provide two-component formulations which react to desired specifications. For example, polyurethane formulations having appropriate setting times are sold by Urethane Plastics, Inc. of Placentia, Calif. as Model UI5061, and by Polymer Development Laboratories, Inc. in Orange, Calif. as Model PDL972D. Although a polyurethane reaction mixture is preferred, other suitable organic resin systems may be used, for example, polyester resins and epoxy resins. The desired thickness of the shell 75 may vary depending upon the tensile strength of the polymeric resin; however, the wall thickness of the shell should be at least about 0.01 inch and preferably the average wall thickness in the region between the circular retainers 13 is at least about 0.05 inch and generally will not exceed about 0.20 inch unless the shell is to serve as a stand-alone pressure vessel.

Resin components are compounded for such a RIM process as well known in this art, and the flow of the mixture into the mold is timed under carefully regulated pressure so as to completely fill the enclosed void volume of the mold, with the resin coming into direct and intimate contact with the exterior surface of the subassembly of the spirally wound leaves and with the interior exposed surfaces of each circular retainer 13. Preferably, the mixture is one that creates a polymer, such as polyurethane, which has good bonding characteristics and forms a strong adhesive bond to the surfaces with which it comes in contact, particularly those of the circular retainers. In addition, the shallow grooves 37, provided at the proximal ends of the circular surfaces of the recesses 35 of each circular retainer, become filled with polymeric resin thereby positively locking the casing 49 to the circular retainers 13 by creating a pair of annular tongues of an inner diameter less than the outer diameter of the circular surfaces.

In general, the mold is gated so that the injection of the resin mixture from a mixing valve 51 is through a lower entrance opening 53, and the pumped flow continues until some slight amount of excess resin flows out of the mold vent 55 at the upper right-hand corner of the illustration of FIG. 4. The components of the resin mixture are supplied at temperatures such that they have a reasonable viscosity for pumping through the mixing valve, and these components undergo an exothermic reaction within the mold cavity which constitute the cross-linking, i.e. initial curing, of the resin mixture. Accordingly, the mold cavity is cooled usually by the supply of cooling water (not shown) as well known in the art, and the temperature is normally maintained at about 200° F. or below. The length of time required to accomplish the initial curing to create solidification sufficient to allow handling will depend upon the particular resin system being used and can vary from about 30 seconds to about 5 to 10 minutes. The pumping of the resin components through the mixing valve and into the lower entrance is preferably timed so that when the mold cavity is completely full, i.e. when the flowing resin reaches the top outlet sprue 55, significant gelling of the resin is just beginning. Usually, the preferred injection time for a polyurethane resin system is between about 25 seconds and about 60 seconds, and the rate of pump flow is accordingly regulated pursuant to the void volume of the mold cavity wherein the shell will be formed so that that volume of resin will be supplied within the appropriate time frame. All of this is well known in the RIM art.

Although the operation is schematically depicted in FIG. 4 as being carried out in a mold that is aligned horizontally, it also may be preferable to orient the mold at about a 10 to 15 degree angle from the horizontal so that the outlet sprue 55 will be at a point slightly higher than the remainder of the upper wall of the mold cavity to assure that complete filling is achieved. Following the slight overfilling of the mold, injection is halted, and the injected mixture is given adequate time to undergo its chemical transformation, initially curing from the state of a flowable or liquid mixture to an organic polymeric material sufficiently solid to permit handling without impairing the exterior surface. Once the chemical reaction has proceeded to this stage, usually after about 4 minutes for a polyurethane resin system, the cured resin surface can be handled, and the cartridge 11 is removed from the mold as soon as the resin is in condition to allow handling. It is generally then set aside and allowed to completely cure at room temperature, usually for a period of about 24 hours.

The completely cured cartridge 11 is characterized by an integral outer structure in the form of a hard, smooth polymeric tubular casing 49 that is mechanically and adhesively bonded to the two circular retainers 13 at the opposite ends, which are in turn mechanically connected to the central permeate tube, via bonding between the interior surface of the hub portion of each circular retainer to the counterbore in the interior tube surface, thus creating an overall integral structure. As a result, the spiral windings within the overall cartridge are positively restrained during use from any longitudinal distortion, e.g. telescoping, as a result of the interlocking of the circular retainers 13 both along the outer periphery with the shell 49 and along the interior boss 31 of each retainer with the central tube 15. Moreover, they are even more importantly restrained from radial distortion as a result of the formed-in-place integral seamless casing 49, which as explained hereinafter, can be sized so as to precisely fit within the interior of a surrounding pressure vessel wherein the cartridge 11 will be employed for separation purposes.

Figure 6:
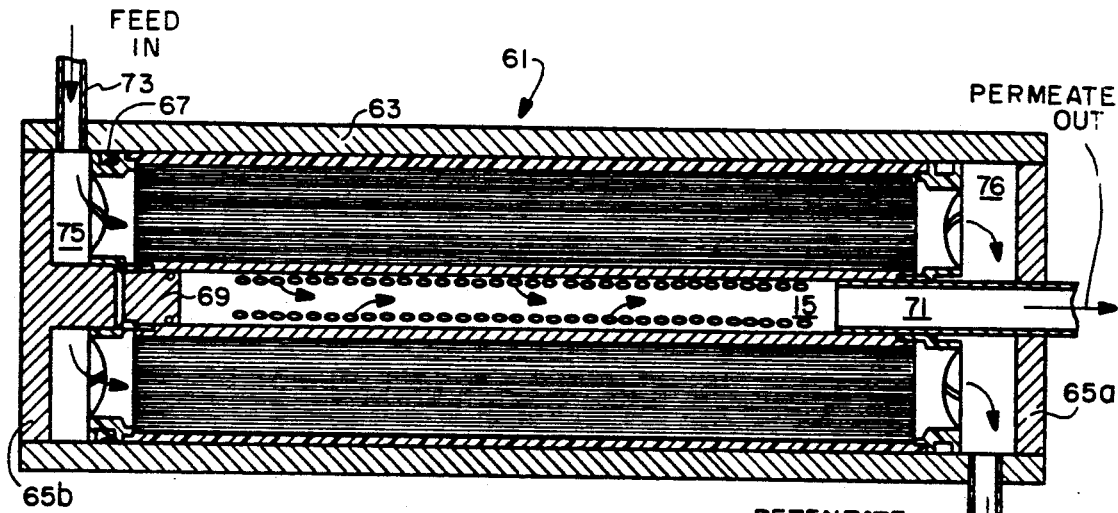
FIG. 6 is a schematic, sectional view of separation apparatus employing the completed membrane cartridge that was produced in the mold cavity of FIG. 4, now shown installed for operation in a pressure vessel.

Following its removal from the injection mold and the 24-hour complete-curing period, the cartridge 11 is essentially ready for use following minor trimming of flashing and short plugs of resin where the mold was gated. As best seen in FIGS. 5 and 6, the exterior surface of the cartridge 11 is smooth and seamless, extending longitudinally from the periphery of one circular retainer rim 38 to the periphery of the other circular retainer rim at the opposite axial end. Moreover, a secure 360-degree locking joint with the circular retainers 13 is provided at each end because of the presence of the bead of polymeric material which forms the annular tongue in the groove 37 in the circular retainer surface. As can further be seen, the totally uniform dimension of the exterior of the cartridge shell 49, which results from the periphery of the circular elements 13 being substantially flush with the interior surface of the injection mold cavity, assures a precise desired fit within the interior of a pressure vessel of a separation device, such as that schematically shown in FIG. 6.

Other important advantages of the invention also reside in the elimination of the need to attempt to obtain high precision in field winding of the subassembly of individual sheets which go into such a spirally-wound membrane element which was heretofore generally a manual or, at best, a semi-automatic operation where it was necessary to precisely control tension and where careful trimming of the ends of a number of separate rectangular sheets was required to even approach roundness and smoothness in the outer surface of the ultimate spirally-wound product—which inevitably had some eccentricity remaining. Generally, such spirally-wound elements were then helically taped over their entire exterior surfaces (as shown, for example, in U.S. Pat. No. 4,842,736), often using a fiberglass roving impregnated with a polyester resin or perhaps an epoxy resin; however, this taping could not remove the eccentricity, which is of course undesirable because such a cartridge is designed to fit into a pressure vessel of circular cross section. On occasion, eccentricity may prevent insertion into a pressure vessel.

It was also considered important that the helical outer taping should restrain the leaves in a tight winding throughout the entire lifetime of the cartridge, lest channeling occur which detracts from efficient performance. By channeling is meant the expansion of isolated portions of the feed passageways (defined by the spacer sheets) wherein the feed solution flows from end to end. The result of channeling is a far greater rate of feed flow, e.g. brackish water, through these expanded channels; this of course detracts from the establishment of relatively uniform flow throughout the entire spiral feed passageway system which is important in order to obtain efficient overall performance of such a separation device. Although, if desired for additional stability, the subassembly 34 that is inserted into the injection mold cavity could include an overall helical wrapping of reinforcing fibers, which would provide even additional circumferential or hoop strength (as for example particularly in the alternative embodiments described hereinafter wherein an integral pressure vessel is formed), such additional strength through wrapping is not considered to be required to supplement the shell 49 which itself provides substantial hoop strength.

Another important requirement of the outer helical wrap on prior art spirally-wound membranes was its ability to provide handling protection to prevent the occurrence of any cuts, tears, abrasions or the like that would penetrate into the membrane envelope and thus result in the leakage of the higher pressure feed liquid directly into the permeate passageway within the envelope, resulting in serious loss of efficiency. The strong tough polymeric shell which is integrally joined to the circular retainers 13 that are in turn mechanically connected to the central permeate tube 15, creates an integral overall structure that provides positive protection against potential penetration from the exterior of the cartridge, with the polymeric outer tubular shell providing excellent protection in the region most susceptible to handling injury. Moreover, the polymeric shell 49 will provide superior resistance to long-term cracking and/or fatigue due to water hammer and fluctuating feed pressures—resulting in increased cartridge lifetimes.

Illustrated schematically in FIG. 6 is a separation device 61 which includes an outer pressure vessel 63 which is closed at its ends by removable plates 65a and 65b which are attached using standard connectors as well known in this art. Because of the uniformity of the cartridge 11, it can easily be slid into position within the pressure vessel 63 of the separation device, equipped with a chevron-type annular seal 67 in the rectangular groove 39 of the circular retainer adjacent the feed end of the cartridge. The left-hand end plate 65b of the pressure vessel is provided with a central plug portion 69 which protrudes through the hub of the circular retainer 13 at the feed end of the cartridge and enters the end of the porous central tube 15. An O-ring (not shown), which is located in a groove in the outer surface of the plug, seals against the interior wall of the central tube 15 and thus prevents any flow past the plug into the permeate tube 15 at this end. Although the pressure vessel is shown as having one removable plate 65 including such a central plug, it could alternatively be provided with a plate having a central opening, as is schematically represented at the other end, if it were desired to link the pressure vessel 61 to another.

At the outlet end, the pressure vessel removable closure plate 65a is provided with an opening through which a central connector tube 71 fits. The inner end of the tube 71 also carries an O-ring (not shown) in a groove in its exterior surface which seats in sealing engagement against the interior surface of the permeate tube 15 just axially inward of the counterbore. This tube 71 provides communication with the interior region of the permeate tube 15 and serves as the permeate outlet connection to the exterior of the pressure vessel 63.

In operation, a feed stream enters an inlet tube 73 which is generally radially positioned at the upper left-hand corner of the FIG. 6 apparatus and delivers the high pressure feed fluid to the toroidal region 75 at the feed end of the pressure vessel, which region serves as a short annular plenum leading directly into the open regions between the radial arms 43 and then to the spiral passageways defined by the spacer material sheets 21. As the feed flows axially along the length of the cartridge, it becomes more concentrated, as the permeate passes through the permeselective openings in the semipermeable membrane material 17, with the remainder of the feed (or retentate) continuing to flow toward the outlet end. At the right-hand end, as shown in FIG. 6, the concentrate or retentate flows through the openings in the other circular retainer into a similar plenum 76 and then out a side outlet 77, which is separate of course from the central permeate outlet 71. Instead of having the exit outlet 77 for the retentate in the side of the pressure vessel, it could alternatively be provided at an off-center location in the removable closure plate 65a.

The overall cartridges 11 including the molded or formed-in-place outer casings 49 not only have improved performance characteristics because of their ability to maintain precise outer tolerances and tight constraint of the spirally-wound leaves, but, as previously indicated, they have significantly improved handling characteristics because the tough polymeric outer shell substantially eliminates the potential for inadvertent damage to the spirally-wound subassembly. These advantages, coupled with the improvement in manufacturing operations and the reduction in quality control expenses, make this cartridge design extremely desirable.

Figure 7:
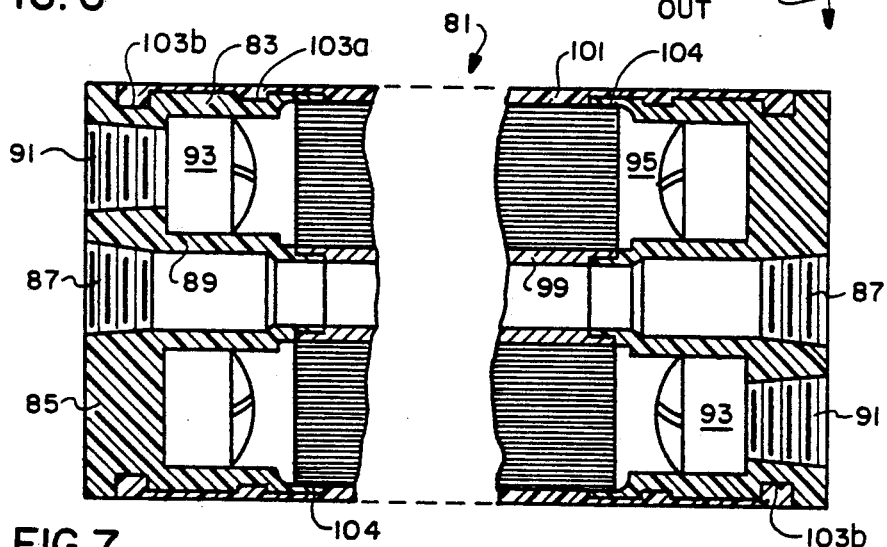
FIG. 7 is a sectional view, generally similar to that of FIGS. 5 and 6, of an alternative embodiment of a cartridge wherein an integral pressure vessel is created as a part of the cartridge shell arrangement.

Illustrated in FIG. 7 is an alternative form of a cartridge 81 embodying various features of the invention in which a circular retainer or ATD 83 of a different design is employed, which is elongated in axial length. It has a solid end disk portion 85 that is provided with a central opening 87 leading into a hub 89 and an off-center opening 91 leading into a plenum chamber 93 formed within the interior of the circular retainer. It may be desirable to injection mold the ATD 83 as two separate interfitting pieces. Comparison with the circular retainer 13 utilized in the assembly illustrated in FIG. 3 shows that the elongated circular retainer 83 includes a circumferential peripheral surface portion which is recessed from its greatest diameter which appears at the outer edge of the rim of the end disk 85, and it also includes a plurality of radial struts 95 radiating from the central hub 89 which likewise includes a male boss 97 that is received in a counterbore provided in the central permeate tube 99. This design is particularly adapted to providing a stand-alone, sealed pressure vessel type cartridge wherein the pair of center and off-center openings 87, 91 through the elongated circular retainers 83 at each end of the cartridge facilitate suitable sealing connections so as to facilitate operation of the integral cartridge 81 under pressure as a stand-alone unit without the need for the surrounding pressure vessel, as illustrated in FIG. 6.

In this respect, the center holes 87 are provided with pipe threads to facilitate coupling two or more of these sealed cartridges 81 together in series connection or simply to allow permeate flow out both ends of the unit if desired for a particular application. On the other hand, if the cartridge 81 is being used singly, a suitably threaded plug may be inserted in one of the two central openings 87 so that the permeate flow would exit only from the single opening at the opposite open end. Of course, pipe threads are not required, as any other suitable sealed connection between the openings 87, 91 and a conduit could alternatively be employed. Similarly, pipe threads are provided leading into the off-center openings 91 in each of the circular retainers, for connection respectively to an inlet feed pipe and to an exit retentate or concentrate pipe. As can be seen in FIG. 6, these openings lead into the toroidal chambers 93 which provides 360 degree access to the axial ends of the spirally-wound membrane subassembly, similar to the arrangement depicted in FIG. 6.

The elongated peripheral surface of the extended circular retainers provides the opportunity for an even stronger seal to be created between the circular retainers and the formed-in-place shell 101. In this respect, a first shallow groove 103a of rectangular cross-section is provided generally near the inner end of the circular retainer, and a deeper rectangular groove 103b is provided spaced therefrom in the otherwise generally solid disk portion 85 of the circular retainer. The outer diameter of the retainer 83 in the region between the two grooves and in the region of a short circular flange portion 104 that fits about the spirally-wrapped membrane assembly is recessed so as to be a predetermined amount less than the diameter at the outermost end of the rim, which is proportioned to be equal to the interior diameter of the mold cavity. If desired, the design can be such that the main central portion of spirally-wound membrane subassembly is slightly smaller in diameter than that illustrated in FIG. 3, or the outer rim sections can be slightly greater in diameter to create a slightly thicker shell 101 and provide additional hoop strength and resistance to possible outward bowing from the pressure of the feed stream within the operating cartridge.

Generally such integral pressure vessel cartridges are used with feed streams at pressures of about 200 psi or less; however, depending upon the thickness of the wall, the strength of the polymeric material and whether or not any reinforcement is included (as hereinbefore discussed), pressures in the neighborhood of 250 to 300 psi or even higher above may be used. For example, such integral pressure vessel cartridges having an exterior diameter of about 4 inches may have a shell thickness of about 0.25 inch or more, e.g. 0.40 inch. Because the requirement for wall strength varies with the overall diameter of the cartridge, the larger the diameter, the greater the wall thickness of the shell should usually be. For example, for cartridges having an outer diameter of about 8 inches, a wall thickness equal to about 0.5 inch to about 0.8 inch may be used. In the finished cartridge, a very good pressure containment structure is created because of the provision of the pair of spaced apart locking grooves 103a,b at each end of the shell, which grooves have wall surfaces that are perpendicular to the outer surface and thus provide an extremely strong joint in the form of the two pairs of 360 degree extending, spaced apart, interengaging surfaces, which is supplemented by the strong adhesive bond between the interior surface of the preferably urethane shell and the recessed peripheral surface of the elongated circular retainer in the region between these two grooves.

To fabricate the cartridge depicted in FIG. 7, the loading of the subassembly into the mold would be substantially the same. Optional seals could be provided between the smooth cylindrical surface of the mold cavity and the extreme ends of the ATDs 83; the entrance opening for the chemicals being injected and the overflow outlet opening would be substantially the same. Similar reaction molding compounds can be employed as those described hereinbefore. The difference between the diameter at the exterior rim end of the circular retainer 83 (which is equal to the diameter of the mold cavity) and the diameter of the rolled spirally-wound membrane subassembly determines the wall thickness of the molded-in-place casing 101 and should be of a sufficient dimension so as to provide the necessary wall strength for containment of the anticipated pressure, as discussed hereinbefore. Generally, the wall strength is a measure of the thickness of the casing wall and the tensile strength of the polymeric material employed, and generally a thicker wall casing will be employed in a cartridge designed to alone withstand the internal pressure within the cartridge during operation, than in a cartridge intended for use within a surrounding pressure vessel. Moreover, somewhat more rigid polymeric resins may be employed in making such a pressure vessel type cartridge. The use of fiber reinforcement could also be included, if desired, for this purpose; for example, a tubular sleeve of woven fibrous form or the like could be mechanically bonded to the circular flanges at the inner ends of each of the circular retainers 83 before the subassembly is placed in the mold. Such a sleeve would then become an integral portion of the casing as a result of its being enveloped by the polymerizing resin materials being injected into the mold during the reaction injection molding process. The presence of such reinforcement would further improve the overall integrity of the integral pressure vessel which completely envelopes the spirally-wound membrane assembly, providing only the two threaded openings 87, 91 which appear in the end walls of the circular retainers at each end of the cartridge, and as a result, there would be even additional restraint to counteract longitudinal distortion, as well as radial distortion or unwinding, when the spirally-wound membrane assembly is subjected to internal fluid pressure appropriate to the normal operation of reverse osmosis or ultrafiltration separation processes for which cartridges are designed.

Figure 8:
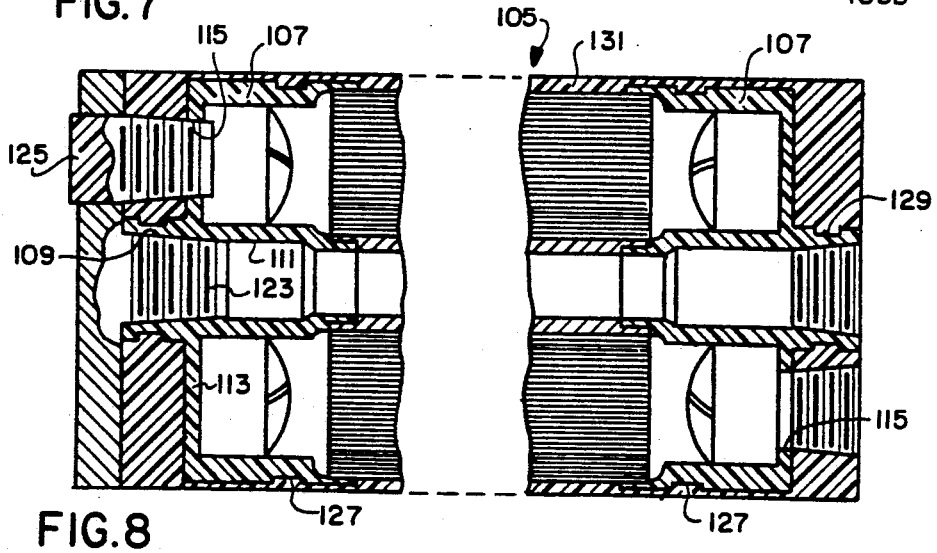
FIG. 8 is a sectional view similar to FIG. 7 of yet another embodiment of such a cartridge which likewise includes an integral pressure vessel and which is illustrated after it has been removed from the mold cavity, but before one metal fixture plate and plug, used in the molding operation, have been removed from the lefthand end thereof.

Illustrated in FIG. 8 is a second alternative type of cartridge 105 embodying various features of the invention which is also designed to function as an integral pressure vessel having only two openings at each axial end, as in the case of the cartridge shown in FIG. 7. In the FIG. 8 version, a circular retainer 107 is employed which somewhat resembles that shown in FIG. 3; however, it has an outer diameter which is always less than the intended outer diameter of the cartridge. It has a longitudinal central extension 109 on the hollow hub 111, which extension carries internal threads and essentially extends into the outer region occupied by the solid end disk in the FIG. 7 embodiment. Only a relatively thin annular wall 113 is provided extending radially from the hub to the rim, which wall is solid except for a single off-center hole 115 that is also threaded. As a result of the reduced outer diameter of the retainer 107, polymeric resin material flows or wraps around the outer surface of the wall 113 and creates the major portion of what constitutes an end disk portion 117 (similar to the portion 85 in the FIG. 7 embodiment). As seen in FIG. 8, the diameter of the longitudinal central extension 109 is less than ½ of the diameter of the cartridge and preferably less than ⅓ of the diameter. As a result, when the polymeric resin being injected occupies this entire region from the mold cavity wall to the peripheral surface of the central extension, an extremely strong junction is created. In other words, the incorporation of an annular wall of polymeric resin at each end of the cartridge, having a radial dimension equal to at least about ¼ and preferably at least about ⅓ of the diameter of the cartridge, creates a particularly strong arrangement that will effectively withstand a buildup of internal pressure within the cartridge as a result of the presence of these transverse end walls.

The RIM molding process that is used is generally similar to that described hereinbefore except that, before the subassembly is placed in the injection mold, end fixtures 121 are attached to each of the circular retainers 107 as depicted at the left hand end of FIG. 8. It should be understood that the right hand end is shown after the end fixture has been removed. These fixtures 121 cooperate with the mold cavity in defining the void volume into which the resin will flow upon injection and more particularly determine the configuration of the end surfaces of the ultimate cartridge. The end fixture 121 includes a circular portion from which protrudes an integral central coaxial stubshaft or mandrel 123, the exterior of which carries a standard pipe thread; this fixture is screwed into the female pipe thread that is formed on the interior of the extended hub 111 of the circular retainer. There is also included a separate short mandrel or plug 125, carrying on its outer surface a standard pipe thread, which screws into the threaded off-center hole 115 in the retainer; the circular cross section rear end of the plug 125 fits snugly through a circular passageway in the end fixture 121 when that passageway is aligned with the off-center hole 115; an O-ring (not shown) can be carried by the outer end of the plug 125 to assure a seal is created with the fixture 121. In this location in the ultimate cartridge, the plug 125 creates an extension of the female pipe thread from the hole 115. Instead of being formed integrally with a part of the end disk fixture 121, the central stubshaft 123 can be formed as a separate bolt which is either slidably or threadably received in a matching passageway in the center of the circular fixture, if desired.

As in the case of the other embodiments hereinbefore described, the spirally-wound membrane subassembly, with the circular retainers 107 suitedly adhesively bonded or spin-welded to the counterbores in the ends of a central permeate tube 126 and with the end fixtures 121 installed at each axial end, is loaded into the injection mold cavity. Following the injection of the resin components that react to form the polymeric casing, the mold is maintained in its closed position for a sufficient time for the cross-linking reaction to take place and for the individual components to sufficiently cure into a solid form which can be handled without impairing its surface. It is then removed and allowed to completely cure, at room temperature, to solid, substantially rigid, polymeric resin material.

The final finished, completely cured cartridge 105 is characterized by an integral outer structure of desired wall thickness of the RIM polymeric material, which is mechanically and adhesively bonded to, and nearly totally encapsulates, the smaller diameter circular retainers 107 located at each end. In this respect, a rectangular cross-section groove 127 is provided in the outer periphery of the circular retainer, and a similar rectangular groove 129 is provided in the exterior surface of the extended portion 109 of the hub 111. Interlocking and excellent mechanical bonding results both from the filling of these circumferential grooves 127, 129 with the polymeric material, during the creation of the end wall 117 adjacent the annular wall 113, and also from the bonding between the circular retainers and the permeate tube at the surfaces of the counterbore. Again there is also a strong adhesive bond along the periphery of the circular retainer 107 outward of the groove 127 as a result of the preferred use of polyurethane resin. As a result, the design depicted in FIG. 8 is capable of withstanding even higher internal pressures while retaining its dimensional stability than that shown in FIG. 7 when operated as a self-contained pressure vessel unit.

Upon completion of the molding process, the threaded plug portions 125 of the end fixtures are disengaged by unscrewing them from the molded body, leaving the off-center, pipe-threaded opening, that includes the hole 115, which communicates with the plenum chamber. Unscrewing of the fixture 121 itself then exposes the otherwise flat, end wall surface at the end of the cartridge, as shown at the right-hand end of FIG. 8. The nearly total envelopment of the circular retainers 107 by the polymeric resin, which now has formed an outer shell 131, creates a structure wherein the polymerized, injected resin constitutes more than 95% of the outer surface area of the cartridge. This method of molding permits precise dimensional tolerances to be achieved in the manufacture and assures that such cartridges have very adequate mechanical strength sufficient to withstand even relatively high internal pressures during separation operation.

Although the invention has been described with regard to several different embodiments which are believed to constitute the best mode known to the inventors at this time, it should be understood that various changes and modifications as would be obvious to one having the ordinary skill in this art may be made without departing from the scope of the invention which is set forth in the appended claims. For example, although FIGS. 1 through 6 illustrate the preferred method of forming a cartridge which includes an ATD integrally connected as a part of the shell at each axial end thereof, it should be understood that certain advantages of the invention might be obtained by utilizing only a single ATD at one end of the cartridge, or possibly no ATD at either end of the cartridge. In such an instance, there would still be provided an expedient method of manufacturing cartridges of precise uniform exterior diameter incorporating spirally wound membrane subassemblies. If either end of the cartridge was not to have an ATD attached to the end of the shell, then a temporary barrier would be used in the molding step to prevent the injected resin mixture from reaching the exposed axial ends of the spirally wound and taped subassembly, and it is likely that the taped subassembly would not be trimmed until following the creation of the shell so as to provide a smooth flat end surface for the cartridge, particularly at the interface between the shell and the tape barrier.

Moreover, although the use of reaction injection molding has been stressed, other comparable molding processes, such as transfer molding of thermosetting resins, can alternatively be employed, using mold cavities of essentially the same design. Likewise, although polyurethanes, polyesters and polyepoxides have been discussed as preferred materials for making the strong, tough shell that is formed-in-place as a part of the cartridge, other comparable organic polymeric materials, particularly thermosetting plastics, can be used as known in this art in which development of such polymeric resins continues at the present time.

Particular features of the invention are emphasized in the claims which follow.

What is claimed is:

1. A spirally wound semipermeable membrane cartridge comprising
    a central permeate tube,
    at least one elongated, generally flat, tubular membrane envelope the interior of which envelope contains permeate passageway material, said envelope interior being in fluid communication with the interior of said central tube,
    inlet flow-passageway-providing material,
    said envelope and said inlet flow-passageway-providing material being disposed in a spiral winding about said central permeate tube with said inlet flow-passageway-providing material creating a spiral flow path which extends axially, from end to end, through said spiral winding, said spiral flow path being in communication with exterior surfaces of said semipermeable membrane envelope,
    a circular retainer at each end of said spirally wound assembly, which retainers have traverse openings to permit fluid flow therethrough either to or from said spiral flow path, and
    an exterior, generally tubular, formed-in-place shell of polymeric material surrounding said spirally wound assembly, said shell extending between and interconnecting said circular retainers and providing an outer right cylindrical surface of uniform dimension for said cartridge, which shell is designed to provided circumferential restraint sufficient to substantially preclude channeling through said spirally wound assembly throughout said cartridge lifetime.

2. A cartridge in accordance with claim 1 wherein each end of said central permeate tube and said respective circular retainer have interengaging means which mate in engagement such that said central permeate tube accurately centers said two circular retainers on the same longitudinal axis.

3. A cartridge in accordance with claim 2 wherein said formed-in-place shell is sealed to both of said circular retainers by the adhesive character of said polymeric material and creates an integral structure with said retainers.

4. A cartridge according to claim 3 wherein the peripheral surface of each of said circular retainers has an annular groove and wherein said formed-in-place shell includes a pair of inwardly extending annular tongues, one of which respectively fills said groove in each of said retainers, thereby uniting said shell to both said circular retainers.

5. A cartridge in accordance with claim 4 wherein said annular groove is formed in a peripheral portion of each of said circular retainers which lies adjacent said spirally wound assembly.

6. A cartridge in accordance with claim 3 wherein said shell forms a portion of an integral pressure vessel, wherein said circular retainer elements at each end of said tube are affixed thereto by bonding, wherein each circular element has an axially inward surface, an axially outward surface, a peripheral surface, and a toroidal chamber formed therewithin, which chamber extends from said axial inward surface, and wherein opening means in said element provide communication between said toroidal chamber and said axially outward surface.

7. A cartridge according to claim 2 wherein a counterbore is provided in the interior surface of said central permeate tube at each end thereof and wherein each said circular retainer has a protruding male boss which is received in said counterbore and which has an inner diameter substantially equal to the inner diameter of said central tube.

8. A cartridge according to claim 1 wherein the wall thickness of said outer shell is at least about 0.01 inch.

9. A cartridge according to claim 1 wherein the wall thickness of said outer shell is between about 0.05 inch and about 0.20 inch.

10. A cartridge according to claim 1 wherein said shell is formed with a pair of transverse, radially inwardly extending walls, one at each axial end, which walls each lie axially beyond and abut a transverse surface on one of said circular retainers.

11. A method for making a spirally wound semipermeable membrane cartridge, which method comprises
    providing a central permeate tube having a porous sidewall to provide communication between the interior and exterior thereof,
    providing materials forming at least one length of a semipermeable membrane envelope of generally flat, tubular cross-section, which envelope has permeate passageway material extending throughout the interior thereof,
    connecting one end of said semipermeable envelope materials with said central permeate tube so that the interior of said envelope is in fluid communication through said porous sidewall with the interior of said central tube,
    providing at least one sheet of inlet flow-passageway-providing material,
    spirally winding said tubular envelope materials and said sheet of inlet flow-passageway-providing material about said permeate tube to create a spirally wound, generally cylindrical subassembly of desired outer diameter,
    associating a pair of circular retainers with said central permeate tube, one such retainer being located at each axial end thereof and being coaxial with the other,
    locating said spirally wound subassembly and said associated circular retainers in a mold having a generally cylindrical cavity of circular cross-section proportioned to leave a void region between the major central portion of said assembly and said mold cavity cylindrical wall, closing said mold and injecting flowable material under pressure into said void region between the outer surface of said spirally wound subassembly and the interior wall of said mold cavity so as to substantially fill the annular, longitudinally extending region and thereby encapsulate said spirally wound assembly in an exterior, generally tubular, polymeric shell which extends between and is attached to said pair of circular retainers to create an integral cartridge, and removing said cartridge from said mold following solidification of said exterior polymeric shell designed to provide circumferential restraint sufficient to substantially preclude channeling through said spirally wound assembly for its lifetime.

12. A method in accordance with claim 11 wherein each of said circular retainers has an annular groove in its peripheral surface and wherein said flowable material which is injected into said mold fills said annular grooves and locks said circular retainers to each other as an integral structure via said molded polymeric shell.

13. A method in accordance with claim 12 wherein said spirally wound subassembly is wrapped about its entire lateral periphery with an impermeable covering prior to locating it in said mold cavity.

14. A method in accordance with claim 13 wherein said covering is also wrapped about edge portions of said retainers adjacent said subassembly.

15. A method according to claim 12 wherein each end of said permeate tube is mechanically engaged in coaxial relationship with said associated circular retainer so that the location of said circular retainers within said mold cavity precisely aligns said permeate tube along the axial centerline of said mold cavity.

16. A method in accordance with claim 11 wherein said flowable material is a mixture of at least two chemical components which undergo a chemical reaction resulting in formation of a substantially rigid exterior polymeric shell.

17. A method in accordance with claim 16 wherein each said circular retainer has at least two longitudinally spaced apart annular grooves in a peripheral surface thereof, which grooves become filled with said injected flowable material during said injecting step.

18. A method in accordance with claim 17 wherein said void region between the outer surface of said spirally wound subassembly and the mold cavity cylindrical wall has an average thickness of at least about 0.25 inch and wherein said polymeric material shell which is formed creates a substantially rigid pressure vessel that will withstand at least about 200 psi internal operating pressure.

19. A method in accordance with claim 17 wherein each said circular retainer has a peripheral diameter less than that of said mold cavity and has a central, internally threaded hub which extends axially outward from an annular wall, wherein each said circular retainer is mated with a cooperating circular fixture which contains a threaded mandrel which is received in said threaded central hub of said retainer and spaces said fixture axially outward from said annular wall, and wherein each said fixture includes an externally threaded plug which extends into an opening in said annular wall, said spacing being such that the region between said annular wall of said retainer element and the facing surface of said circular fixture becomes filled with polymeric material, which material integrally encapsulates said subassembly within a surrounding tubular vessel that envelops both ends thereof by substantially encasing said circular retainer elements, and whereby removal of said externally threaded plug leaves an internally threaded opening leading toward an axial end of said spirally wound subassembly.

20. A method for making a spirally wound semipermeable membrane cartridge, which method comprises providing a central permeate tube having a porous sidewall to provide communication between the interior and exterior thereof, providing materials providing at least one length of a semipermeable membrane envelope of generally flat, tubular cross-section, which envelope has permeate passageway material extending throughout the interior thereof, connecting one end of said semipermeable envelope materials with said central permeate tube so that the interior of said envelope is in fluid communication through said porous sidewall with the interior of said central tube, providing at least one sheet of inlet flow-passageway-providing material, spirally winding said tubular envelope materials and said sheet of inlet flow-passageway-providing material about said permeate tube to create a spirally wound, generally cylindrical subassembly of desired outer diameter, wrapping the entire generally cylindrical peripheral surface of said spirally wound subassembly with an impermeable covering, locating said wrapped, spirally wound subassembly in a mold having a generally cylindrical cavity of circular cross-section proportioned to leave a void region between said covering and said mold cavity cylindrical wall, closing said mold and injecting flowable material under pressure into said void region between the outer surface of said wrapped, spirally wound subassembly and the interior wall of said mold cavity so as to substantially fill the annular, longitudinally extending region and thereby encapsulate said wrapped, spirally wound subassembly in an exterior, generally tubular, polymeric shell, and removing said cartridge from said mold following solidification of said exterior polymeric shell designed to provide circumferential restraint sufficient to substantially preclude channeling through said spirally wound assembly throughout its lifetime.

21. An integral separation device wherein a spirally wound semipermeable membrane assembly is encapsulated within an integral pressure vessel, which device comprises a central permeate tube, at least one elongated, generally flat, tubular membrane envelope the interior of which envelope contains permeate passageway material, said envelope interior being in fluid communication with the interior of said central tube, inlet flow-passageway-providing material, said envelope and said inlet flow-passageway-providing material being disposed in a spiral winding about said central permeate tube with said inlet flow-passageway-providing material creating a spiral flow path, which flow path extends axially from end to end through said spiral winding, said flow path being in communication with exterior surfaces of said semipermeable membrane envelope, a circular retainer at each end of said spirally wound assembly, which retainers have openings to permit fluid flow therethrough in a generally axial direction either to or from said spiral flow path, and an exterior, generally tubular, formed-in-place shell of polymeric material surrounding said spirally wound assembly which is designed to provide circumferential restraint sufficient to substantially preclude channeling through said spirally wound assembly throughout the lifetime of said separation device, said shell extending between and interconnecting said circular retainers as a result of being sealed thereto and providing therewith an integral pressure vessel having an outer right circular cylindrical surface of uniform dimension, said pressure vessel having a feed inlet passageway formed in one axial end thereof, and a retentate exit passageway formed in the opposite axial end thereof, said passageways leading to said openings in said retainers, and at least one of said circular retainers having a central opening in a hub portion thereof which communicates with the interior of said central permeate tube, whereby said separation device is capable of operating without any surrounding pressure vessel to produce a permeate stream and a separate retentate stream when an inlet stream to be treated is fed thereto.

* * * * *